(12) United States Patent
Reyes et al.

(10) Patent No.: US 11,365,342 B2
(45) Date of Patent: Jun. 21, 2022

(54) METAL SULFATE SCALE DISSOLUTION

(71) Applicant: Halliburton Energy Services, Inc., Houston, TX (US)

(72) Inventors: Enrique Antonio Reyes, Tomball, TX (US); Kristina Henkel Holan, Cypress, TX (US); Aaron Michael Beuterbaugh, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/051,794

(22) PCT Filed: Jul. 17, 2018

(86) PCT No.: PCT/US2018/042522
§ 371 (c)(1),
(2) Date: Oct. 30, 2020

(87) PCT Pub. No.: WO2020/018080
PCT Pub. Date: Jan. 23, 2020

(65) Prior Publication Data
US 2021/0079289 A1   Mar. 18, 2021

(51) Int. Cl.
*C09K 8/528* (2006.01)
*E21B 37/06* (2006.01)

(52) U.S. Cl.
CPC .............. *C09K 8/528* (2013.01); *E21B 37/06* (2013.01)

(58) Field of Classification Search
None
See application file for complete search history.

(56) References Cited

U.S. PATENT DOCUMENTS

| | | | |
|---|---|---|---|
| 3,706,669 A | 12/1972 | Gardner | |
| 3,951,827 A * | 4/1976 | Burroughs | ............... C02F 5/08 507/241 |
| 4,096,869 A | 6/1978 | Lawson | |
| (Continued) | | | |

FOREIGN PATENT DOCUMENTS

| | | |
|---|---|---|
| CN | 106867490 A | 6/2017 |
| WO | 9011972 A | 10/1990 |
| (Continued) | | |

OTHER PUBLICATIONS

International Search Report and Written Opinion dated Apr. 11, 2019, International PCT Application No. PCT/US2018/042522.
Smith, C. F., T. J. Nolan III, and P. L. Crenshaw. "Removal and inhibition of calcium sulfate scale in waterflood projects." Journal of Petroleum Technology 20.11 (1968): 1-249.
(Continued)

*Primary Examiner* — John J Figueroa
(74) *Attorney, Agent, or Firm* — McGuireWoods LLP

(57) ABSTRACT

Provided are treatment fluids and associated methods for removing metal sulfate scale. An example method includes introducing a treatment fluid into a wellbore comprising metal sulfate scale, wherein the treatment fluid comprises: a phosphonated aminocarboxylate; a carboxylated alkanol, a carboxylated alkyl halide, and/or a multicarboxylic acid; an anion; and an aqueous base fluid; wherein the treatment fluid has a pH in a range between about 7 to about 13. The method further includes contacting the metal sulfate scale with the treatment fluid; wherein the treatment fluid is allowed to remain static during the contacting; and removing the treatment fluid from the wellbore.

20 Claims, 4 Drawing Sheets

(56) References Cited

U.S. PATENT DOCUMENTS

| | | | |
|---|---|---|---|
| 4,747,975 A | 5/1988 | Ritter | |
| 5,026,481 A | 6/1991 | Paul et al. | |
| 5,282,995 A | 2/1994 | Paul et al. | |
| 5,685,918 A | 11/1997 | Tate | |
| 6,331,513 B1 | 12/2001 | Zaid et al. | |
| 6,494,218 B1 | 12/2002 | Zaid et al. | |
| 7,470,330 B2 | 12/2008 | Keatch | |
| 2015/0083669 A1 | 3/2015 | Matherly et al. | |
| 2015/0175872 A1 | 6/2015 | Bertkau et al. | |
| 2015/0211345 A1* | 7/2015 | Reyes | C09K 8/72 166/300 |
| 2017/0313927 A1 | 11/2017 | Mason | |
| 2018/0037805 A1 | 2/2018 | Utschig-Samuels et al. | |
| 2018/0273827 A1* | 9/2018 | Beuterbaugh | E21B 37/06 |

FOREIGN PATENT DOCUMENTS

| | | |
|---|---|---|
| WO | 2016130127 A1 | 8/2016 |
| WO | 2019041023 A1 | 3/2019 |
| WO | 2020018080 A1 | 1/2020 |

OTHER PUBLICATIONS

Reyes-Garcia, Enrique Antonio, and Kristina Henkel Holan. "Are Scale-Dissolver Enhancers Necessary for Calcium Sulfates?." SPE International Oilfield Scale Conference and Exhibition. OnePetro, 2020.

Garcia-Olvera, G., et al. "A Novel Solution to Remove Carbonate and Sulfate Scale in Electric Submersible Pumps, Offshore Oil Wells in the Gulf of Mexico." SPE International Oilfield Scale Conference and Exhibition. OnePetro, 2018.

Reyes-Garcia, Enrique, and Kristina Holan. "Removing Scale Damage with Fast-Acting Anhydrite CaSO4 Removal System." SPE International Conference and Exhibition on Formation Damage Control. OnePetro, 2020.

Reyes-Garcia, Enrique, et al. "Operational Efficiency Gains in the Removal of Calcium Sulfate Scale from Electric Submersible Pumps in Offshore Wells." SPE Annual Technical Conference and Exhibition. OnePetro, 2020.

Hassan, Amjed M., and Hasan S. Al-Hashim. "Surface charge study of EDTA interaction with carbonate rock during chelating agent flooding." Journal of Petroleum Science and Engineering 191 (2020): 107163.

\* cited by examiner

METAL SULFATE SCALE DISSOLUTION

TECHNICAL FIELD

The present disclosure relates generally to well remediation operations, and more particularly, to treating metal sulfate scale by dissolving and removing the metal sulfate scale in a single-step treatment.

BACKGROUND

Metal sulfate scaling occurs from the deposition of metal sulfates on surfaces within a wellbore, for example, the surfaces of wellbore tools and equipment. Metal sulfate scaling may reoccur frequently over the lifetime of the well. The metal sulfate scale may coat perforations, casing, production tubulars, valves, pumps, and downhole completion equipment. Metal sulfate scaling may lead to decreases in production and recovery by creating artificial chokes and restricting flowthrough of produced fluids. In extreme cases, metal sulfate scaling may require abandonment if the scaling is so severe that the well is no longer economically viable.

Metal sulfate scaling may occur when brines or treatment fluids comprising metals and/or sulfates contact a formation or other fluid also comprising metals and/or sulfates and together form a concentration of metal sulfate exceeding the solubility of the solvent fluid(s). The formation of metal sulfate may be influenced by temperature, pressure, pH, and any other factor that may effect the metal sulfate solubility of a solvent fluid.

Regardless of cause, metal sulfate scale may need to be removed to prevent losses in production. Mechanical and chemical means of removing metal sulfate scale have been developed. For example, mechanical methods may include bailing, jetting, or running a pig. Chemical methods may include the use of scale solvents or converters. The present invention provides improved methods and compositions for removing metal sulfate scale.

BRIEF DESCRIPTION OF THE DRAWINGS

Illustrative examples of the present disclosure are described in detail below with reference to the attached drawing figures, which are incorporated by reference herein, and wherein.

Figure 1:
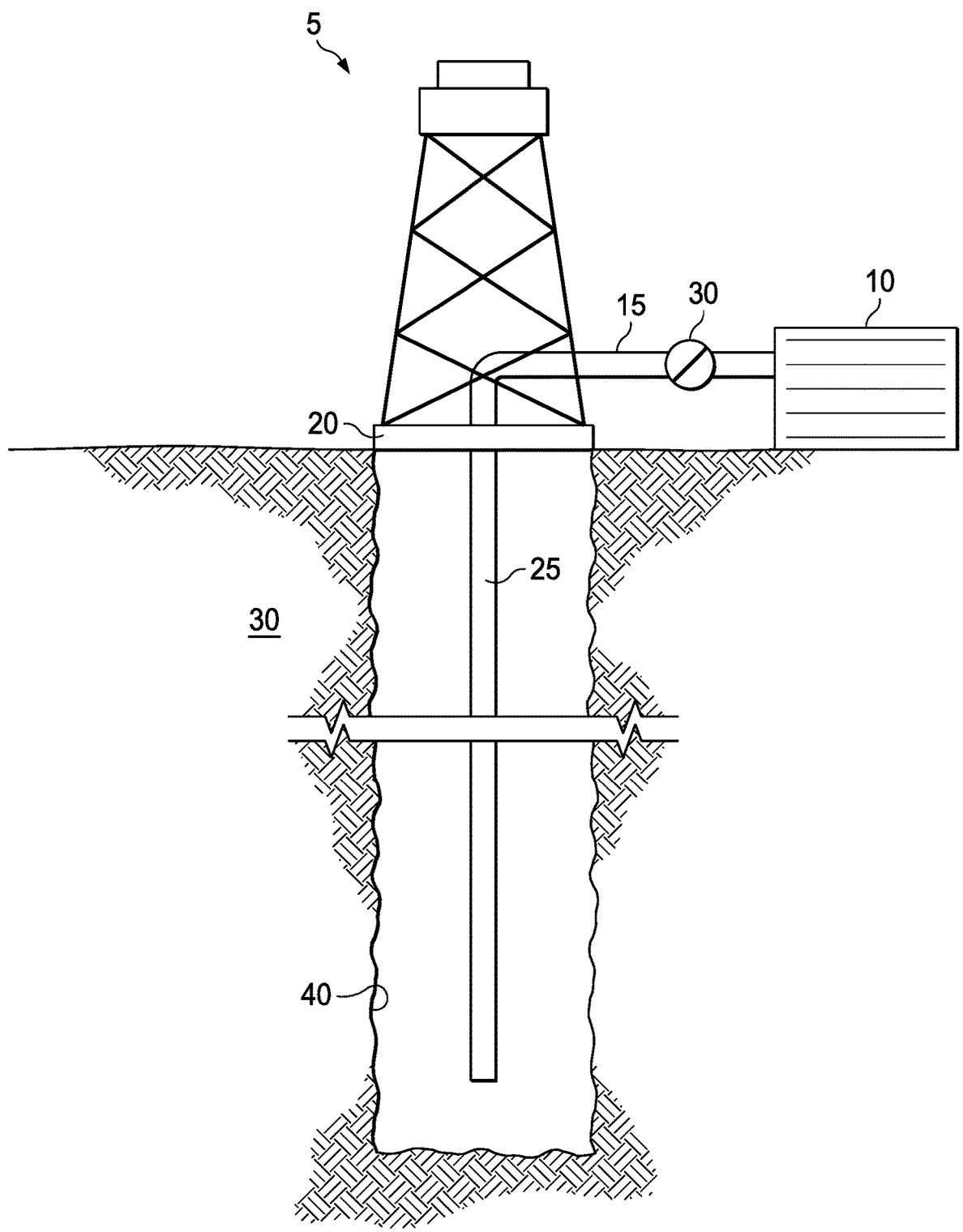
FIG. 1 is a schematic illustrating a surface portion of an example treatment fluid delivery system for delivering a treatment fluid to a target downhole location in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to well remediation operations, and more particularly, to treating metal sulfate scale by dissolving and removing the metal sulfate scale in a single-step treatment.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Unless otherwise specified, any use of any form of the terms "connect," "engage," "couple," "attach," or any other term describing an interaction between elements is not meant to limit the interaction to direct interaction between the elements and may also include indirect interaction between the elements described. Further, any use of any form of the terms "connect," "engage," "couple," "attach," or any other term describing an interaction between elements includes items integrally formed together without the aid of extraneous fasteners or joining devices. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

Examples of the treatment fluid and method described herein relate to the use of the treatment fluid to dissolve metal sulfate scale. Advantageously, the treatment fluid utilizes a single-step reaction to remove the metal sulfate scale. As such, the metal sulfate scale is removed without conversion to a different metal salt such as a metal carbonate, and thusly there is no need to utilize an additional acid or other dissolution step to dissolve the converted metal salt. An additional advantage is that the single-step reaction does not require further mechanical intervention such as bailing, jetting, running a pig, etc. The treatment fluid contacts the scaled portion of the wellbore and/or wellbore equipment and is allowed to sit under static conditions for a short period (e.g., less than four hours) to dissolve the metal sulfate scale and then the treatment fluid comprising the dissolved metal sulfate scale is pumped out of the wellbore without the need for additional remediation operations. A further advantage of the treatment fluid is that it may dissolve the metal sulfate scale in a relatively short period compared to other scale remediation operations, for example, the total reaction may be four hours or less. One other advantage is that the treatment fluid does not require recirculation and thus does not need additional wellbore equipment. The treatment fluid need only remain static in the wellbore at the target location to soak the scaled equipment or formation for a desired reaction time, at which point it may be removed from the wellbore.

FIG. 1 is a schematic illustrating a surface portion of an example treatment fluid delivery system 5 for delivering a treatment fluid to a target downhole location. It should be understood that while FIG. 1 generally depicts a land-based system, it is to be recognized that like systems may be operated in subsea locations as well. The treatment fluid delivery system 5 may include mixing tank 10, in which a treatment fluid of the present disclosure may be formulated. The treatment fluid may be conveyed via line 15 to wellhead 20, where the treatment fluid enters tubular 25. Tubular 25 extends from wellhead 20 into subterranean formation 30. In some examples, tubular 25 may include orifices that allow the treatment fluid to enter into the wellbore 40. Pump 35 may be configured to raise the pressure of the treatment fluid to a desired degree before its introduction into tubular 25. It is to be recognized that treatment fluid delivery system 5 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Mixing tank 10 may be upstream of pump 35 and may comprise a vessel in which the components of the treatment fluid are provided and formulated with a carrier fluid in order to produce the treatment fluid. In various examples, pump 35 (e.g., a low-pressure pump, a high-pressure pump, or a combination thereof) may convey the treatment fluid from mixing tank 10 or other source of the treatment fluid to tubular 25. In other examples, the treatment fluid may be formulated offsite and transported to a worksite, in which case the treatment fluid may be introduced to tubular 25 via pump 35 directly from its shipping container (e.g., a truck, a railcar, a barge, or the like) or from a transport pipeline. In either case, the treatment fluid may be drawn into pump 35, elevated to an appropriate pressure, and then introduced into tubular 25 for delivery downhole.

Pump 35 may be a high-pressure pump in some examples. As used herein, the term "high-pressure pump" will refer to a pump that is capable of delivering a fluid downhole at a pressure of about 1000 psi or greater. The treatment fluids described herein may be introduced with a high-pressure pump. In some examples, the high-pressure pump may be capable of fluidly conveying particulate matter into subterranean formation 30. Suitable high-pressure pumps will be known to one having ordinary skill in the art and may include, but are not limited to, floating piston pumps and positive displacement pumps.

In other examples, the pump 35 may be a low-pressure pump. As used herein, the term "low-pressure pump" will refer to a pump that operates at a pressure of less than about 1000 psi. In some examples, a low-pressure pump may be fluidly coupled to a high-pressure pump that is fluidly coupled to tubular 25. That is, the low-pressure pump may be configured to convey the treatment fluid to the high-pressure pump. In such examples, the low-pressure pump may "step up" the pressure of a treatment fluid before it reaches the high-pressure pump. Alternatively, the low-pressure pump may be used to directly introduce the treatment fluid to subterranean formation 30.

Figure 2:
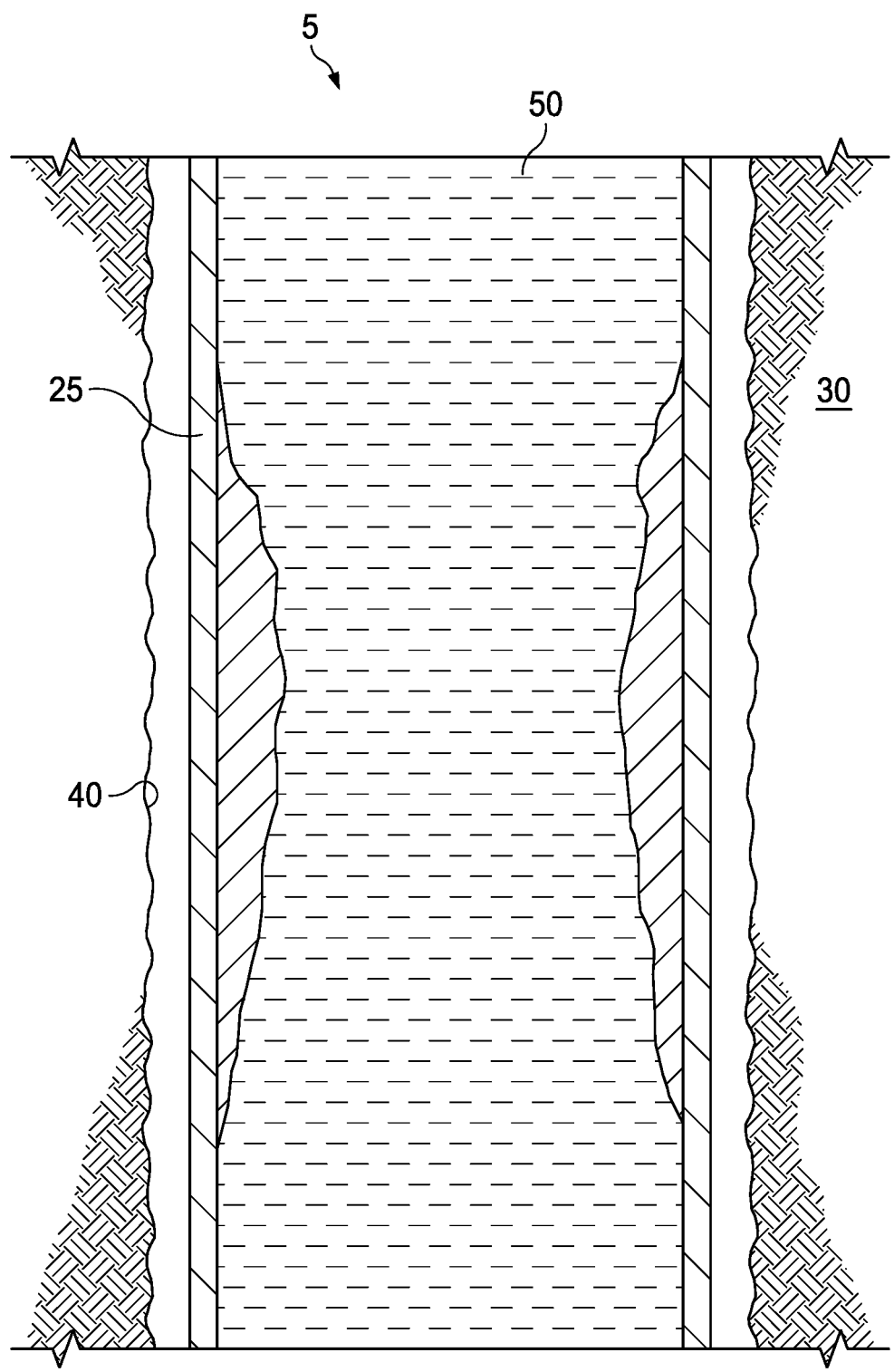
FIG. 2 is a schematic illustrating a downhole portion of the example treatment fluid delivery system illustrated in FIG. 1 in accordance with one or more examples described herein.

FIG. 2 is a schematic illustrating a downhole portion of the example treatment fluid delivery system 5 illustrated in FIG. 1. As illustrated, tubular 25 is disposed within wellbore 40 and comprises metal sulfate scale 45. In some examples, metal sulfate scale 45 may restrict fluid flow through tubular 25. In the illustrated example, metal sulfate scale 45 is disposed on the interior of tubular 25. In some examples, metal sulfate scale 45 may be disposed on the exterior of tubular 25. Treatment fluid 50 is pumped into tubular 25 to the target location in which the metal sulfate scale 45 is disposed. Treatment fluid 50 may be pumped to the target location via any method as would be readily apparent to one of ordinary skill in the art. Treatment fluid 50 may be conveyed to said target location via tubular 25, via an annulus between tubular 25 and the wall of subterranean formation 30, or via an annulus between tubular 25 and a conduit concentric with tubular 25. When placed at the target location, treatment fluid 50 may be allowed to remain static. The well does not need to be shut in or sealed as treatment fluid 50 contacts metal sulfate scale 45, although the well may be shut in or sealed if desired. By remaining "static," it is to be understood that the pumping of treatment fluid 50 is halted and treatment fluid 50 is not circulated in the wellbore 40. Treatment fluid 50 may then contact metal sulfate scale 45 and dissolve at least a portion of metal sulfate scale 45 for a desired reaction time.

Although not depicted in FIG. 2, at the end of the desired reaction time, spent treatment fluid 50 may be flowed back to wellhead 20 exiting subterranean formation 30. As spent treatment fluid 50 comprises at least a portion of the dissolved metal sulfate scale 45, the flow through tubular 25 should be improved. In some examples, spent treatment fluid 50 may subsequently be recovered and recycled for future scale remediation operations. In other examples, spent treatment fluid 50 may be not be recycled.

No additional chemical intervention to dissolve the metal sulfate scale or mineral or mechanical intervention steps may be needed. For example, the metal sulfate scale 45 is not converted to another type of metal scale, such as a metal carbonate scale, before dissolution. As another example, after the spent treatment fluid 50 is pumped out of the wellbore 40, there may be no need for bailing or jetting. At the end of the reaction time, the spent treatment fluid 50 may be flowed out of the wellbore using any conventional pumping equipment of method. Wellbore operations may then proceed.

Although treatment fluid 50 is illustrated as treating tubular 25, it is to be understood that treatment fluid 50 may be used to treat any surface comprising metal sulfate scales 45. These surfaces may include, but should not be limited to, the surfaces of liners, valves, screens, pumps, vessels, conduits, flow control devices, casing, perforations, completion equipment, mixing equipment, flow lines, pipelines, subsea equipment, or any such surface that could comprise or potentially be subject to metal sulfate scaling.

It should be clearly understood that the example treatment fluid delivery system 5 illustrated by FIGS. 1 and 2 is merely a general application of the principles of this disclosure in practice, and a wide variety of other examples are possible. Therefore, the scope of this disclosure is not limited in any manner to the details of FIGS. 1 and 2 as described herein.

The treatment fluid (e.g., treatment fluid 50 as illustrated in FIG. 2) comprises a phosphonated aminocarboxylate. Examples of the phosphonated aminocarboxylate include, but are not limited to, N-Phosphonomethyl iminodiacetic acid ("PMIDA"), aminotris (methylenephosphonic acid) ("AMP"), N,N-bis(phosphonomethyl)glycine ("BPMG"); additionally, phosphono-based multicarboxylic acids can also be used, such as phosphonobutanetricarboxylic acid ("PBTC"), 2-carboxyethyl phosphonic acid ("CEPA"), 2-hydroxyphosphonocarboxylic acid ("HPAA"), a salt thereof, a hydrate thereof, an acid thereof, an ester thereof, any derivative thereof, or any combination thereof. For some examples, PMIDA is a preferred phosphonated aminocarboxylate. The phosphonated aminocarboxylate may be chosen based on variety of factors including its impact on metal sulfate scale solubility, temperature stability, rate of metal sulfate scale dissolution, compatibility with the high pH base fluids, and minimal or no inducement of corrosion of the wellbore equipment.

The concentration of the phosphonated aminocarboxylate in the treatment fluid may range from about 1% (w/v) to about 50% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the phosphonated aminocarboxylate in the treatment fluid may range from about 1% (w/v) to about 50% (w/v), from about 3% (w/v) to about 50% (w/v), from about 5% (w/v) to about 50% (w/v), from about 10% (w/v) to about 50% (w/v), from about 15% (w/v) to about 50% (w/v), from about 20% (w/v) to about 50% (w/v), from about 25% (w/v) to about 50% (w/v), from about 30% (w/v) to about 50% (w/v), from about 35% (w/v) to about 50% (w/v), from about 40% (w/v) to about 50% (w/v), or from about 45% (w/v) to about 50% (w/v). As another example, the concentration of the phosphonated aminocarboxylate in the treatment fluid may range from about 1% (w/v) to about 50% (w/v), from about 1% (w/v) to about 45% (w/v), from about 1% (w/v) to about 40% (w/v), from about 1% (w/v) to about 35% (w/v), from about 1% (w/v) to about 30% (w/v), from about 1% (w/v) to about 25% (w/v), from about 1% (w/v) to about 20% (w/v), from about 1% (w/v) to about 15% (w/v), from about 1% (w/v) to about 10% (w/v), from about 1% (w/v) to about 5% (w/v), or from about 1% (w/v) to about 3% (w/v). With the benefit of this disclosure, one of ordinary skill in the art will be readily able to prepare a treatment fluid having a sufficient concentration of phosphonated aminocarboxylate for a given application.

The treatment fluid comprises a carboxylate-containing alkanol; a carboxylated alkyl halide (also known as halogenoalkane or alkyl halide where the halide is one of F, Cl, Br, or I); a multicarboxylic acid comprising at least an alpha-, beta-, or gamma-hydroxy acid; aromatic derivatives thereof or combinations thereof. Examples of carboxylate-containing alkanols include, but are not limited to, glycolic acid, mandelic acid, lactic acid, derivatives thereof, or any combination thereof. Examples of carboxylated alkyl halide include, but are not limited to, chloroacetic acid, dichloroacetic acid, trichloroacetic acid, bromoacetic acid, fluoroacetic acid, salts thereof, derivatives thereof, or any combination thereof. Examples of multicarboxylic acids include, but are not limited to, citric acid, tartaric acid, salts thereof, derivatives thereof, or any combination thereof.

The total concentration of the carboxylate-containing alkanol, carboxylated alkyl halide, and the multicarboxylic acid in the treatment fluid may range from about 0.5% (w/v) to about 30% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the total concentration of the carboxylate-containing alkanol, the carboxylated alkyl halide, and the multicarboxylic acid in the treatment fluid may range from about 0.5% (w/v) to about 30% (w/v), from about 1% (w/v) to about 30% (w/v), from about 3% (w/v) to about 30% (w/v), from about 5% (w/v) to about 30% (w/v), from about 7% (w/v) to about 30% (w/v), from about 10% (w/v) to about 30% (w/v), from about 12% (w/v) to about 30% (w/v), from about 15% (w/v) to about 30% (w/v), from about 17% (w/v) to about 30% (w/v), from about 20% (w/v) to about 30% (w/v), from about 22% (w/v) to about 30% (w/v), from about 22% (w/v) to about 30% (w/v), from about 25% (w/v) to about 30% (w/v), or from about 27% (w/v) to about 30% (w/v). As another example, the total concentration of the carboxylate-containing alkanol, the carboxylated alkyl halide, and the multicarboxylic acid in the treatment fluid may range from about 0.5% (w/v) to about 30% (w/v), from about 0.5% (w/v) to about 27% (w/v), from about 0.5% (w/v) to about 25% (w/v), from about 0.5% (w/v) to about 22% (w/v), from about 0.5% (w/v) to about 20% (w/v), from about 0.5% (w/v) to about 17% (w/v), from about 0.5% (w/v) to about 15% (w/v), from about 0.5% (w/v) to about 12% (w/v), from about 0.5% (w/v) to about 10% (w/v), from about 0.5% (w/v) to about 7% (w/v), from about 0.5% (w/v) to about 5% (w/v), from about 0.5% (w/v) to about 3% (w/v), or from about 0.5% (w/v) to about 1% (w/v). With the benefit of this disclosure, one of ordinary skill in the art will be readily able to prepare a treatment fluid having a sufficient concentration of a carboxylate-containing alkanol, carboxylated alkyl halide, and/or a multicarboxylic acid for a given application.

The treatment fluid comprises an anion. Examples of the anion include, but are not limited to, a halide, an alkanol amine, a trialkylamine, a polyamine, an oxoanion, an anionic surfactant, derivatives thereof, or any combination thereof.

The concentration of the anion in the treatment fluid may range from about 0.05% (w/v) to about 9.5% (w/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the anion in the treatment fluid may range from about 0.05% (w/v) to about 9.5% (w/v), from about 0.1% (w/v) to about 9.5% (w/v), from about 0.5% (w/v) to about 9.5% (w/v), from about 1% (w/v) to about 9.5% (w/v), from about 2% (w/v) to about 9.5% (w/v), from about 3% (w/v) to about 9.5% (w/v), from about 4% (w/v) to about 9.5% (w/v), from about 5% (w/v) to about 9.5% (w/v), from about 6% (w/v) to about 9.5% (w/v), from about 7% (w/v) to about 9.5% (w/v), from about 8% (w/v) to about 9.5% (w/v), or from about 9% (w/v) to about 9.5% (w/v). As another example, the concentration of the anion in the treatment fluid may range from about 0.05% (w/v) to about 9.5% (w/v), from about 0.05% (w/v) to about 9% (w/v), from about 0.05% (w/v) to about 8% (w/v), from about 0.05% (w/v) to about 7% (w/v), from about 0.05% (w/v) to about 6% (w/v), from about 0.05% (w/v) to about 5% (w/v), from about 0.05% (w/v) to about 4% (w/v), from about 0.05% (w/v) to about 3% (w/v), from about 0.05% (w/v) to about 2% (w/v), from about 0.05% (w/v) to about 1% (w/v), from about 0.05% (w/v) to about 0.5% (w/v), or from about 0.05% (w/v) to about 0.1% (w/v). With the benefit of this disclosure, one of ordinary skill in the art will be readily able to prepare a treatment fluid having a sufficient concentration of an anion for a given application.

The treatment fluid comprises an aqueous base fluid, also known as an aqueous carrier fluid. The aqueous base fluid may be from any source, provided that it does not contain an excess of compounds that may undesirably affect other components in the treatment fluid. In various examples, the aqueous base fluid may comprise fresh water, salt water, seawater, brine, or an aqueous salt solution. In some examples, the aqueous base fluid may comprise a monovalent brine or a divalent brine. Suitable monovalent brines include, but are not limited to, sodium chloride brines, sodium bromide brines, potassium chloride brines, potassium bromide brines, and the like. Suitable divalent brines include, but are not limited to, magnesium chloride brines, calcium chloride brines, and the like.

The concentration of the aqueous base fluid in the treatment fluid may range from about 0.5% (w/v) to about 25% (w/v). The concentration of the aqueous base fluid in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the aqueous base fluid in the treatment fluid may range from about 0.5% (w/v) to about 25% (w/v), from about 1% (w/v) to about 25% (w/v), from about 3% (w/v) to about 25% (w/v), from about 5% (w/v) to about 25% (w/v), from about 7% (w/v) to about 25% (w/v), from about 10% (w/v) to about 25% (w/v), from about 12% (w/v) to about 25% (w/v), from about 15% (w/v) to about 25% (w/v), from about 17% (w/v) to about 25% (w/v), from about 20% (w/v) to about 25% (w/v), or from about 22% (w/v) to about 25% (w/v). As another example, the concentration of the anion in the treatment fluid may range from about 0.5% (w/v) to about 25% (w/v), from about 0.5% (w/v) to about 22% (w/v), from about 0.5% (w/v) to about 20% (w/v), from about 0.5% (w/v) to about 17% (w/v), from about 0.5% (w/v) to about 15% (w/v), from about 0.5% (w/v) to about 12% (w/v), from about 0.5% (w/v) to about 10% (w/v), from about 0.5% (w/v) to about 7% (w/v), from about 0.5% (w/v) to about 5% (w/v), from about 0.5% (w/v) to about 3% (w/v), or from about 0.5% (w/v) to about 1% (w/v). With the benefit of this disclosure, one of ordinary skill in the art will be able to prepare a treatment fluid having an aqueous base fluid for a given application.

The treatment fluid further comprises a pH adjustor. The pH adjustor may be any base sufficient for adjusting the pH of the treatment fluid to a range of about 7 to about 13 without negatively impacting the functionality of the other treatment fluid components. In some examples, the preferred pH range of the treatment fluid is about 8.5 to about 10. General examples of the pH adjustor include, but are not limited to, any hydroxide or metal hydroxide, borates, or a combination thereof. Specific examples of the pH adjustor include, but are not limited to, ammonium hydroxide, sodium hydroxides, manganese(II) hydroxide, barium hydroxide octahydrate, aluminum hydroxide, calcium hydroxide, iron(III) hydroxide, barium hydroxide, magnesium hydroxide, potassium hydroxide, chromium(III) hydroxide, tin(IV) hydroxide, chromium(II) hydroxide, silver hydroxide, lead(IV) hydroxide, platinum(IV) hydroxide, zinc hydroxide, copper(II) hydroxide, beryllium hydroxide, vanadium(V) hydroxide, iron(II) hydroxide, manganese(IV) hydroxide, lead(II) hydroxide, strontium hydroxide, tin(II) hydroxide, vanadium(III) hydroxide, lithium hydroxide, mercury(II) hydroxide, nickel(II) hydroxide, mercury(I) hydroxide, copper(I) hydroxide, tetraethylammonium hydroxide, tetrabutylammonium hydroxide, choline hydroxide, urea and tetrabutyl urea, isobutylene diurea, derivatives thereof, or any combination thereof. A preferred example of the pH adjustor is ammonium hydroxide.

In some optional examples, the treatment fluid may contain a pH control agent (e.g., a buffer) such as carbonate or bicarbonate to prevent rapid changes in pH. In some examples, the treatment fluid does not comprise a pH control agent. Examples of pH control agents include, but are not limited to, phosphate, dihydrogen phosphate, monohydrogen phosphate, sulfate and bisulfate, sulfite and bisulfite, boric acid, borate salts and polyborate species (e.g., perborate, metaborate, pentaborate, tetraborate, diborate, $B[OH]_4$, $B_2[OH]_5$, $B_2[OH]_7^-$, $BO_2^-$, $B_4O_7^{2-}$, $B_2O_3$, $[BO_2]_2$, $BO_4$, $B_4O_5(OH)_4^{2-}$, $B_3O_3(OH)_4^-$, $B_5O_6(OH)_4^-$, $B_2O(OH)_5^{3-}$, $B_2[OH]_7^-$; etc.), non-stoichiometric borates (e.g., ulexite mineral), or any combinations thereof.

In some examples, the treatment fluid may provide a metal sulfate scale dissolution of 75% or greater in a reaction time of less than 4 hours. In a specific example, the treatment fluid may dissolve greater than 80% of the metal sulfate scale in a reaction time of less than 2 hours. In another specific example, the treatment fluid may dissolve greater than 80% of the metal sulfate scale in a reaction time of less than 1 hour.

The treated metal sulfate scale may be any metal sulfate scale including any polymorph of a metal sulfate scale. The metal sulfate scale may include, but is not limited to, calcium sulfate polymorphs such as gypsum, anhydrite, and hemihydrate; barium sulfate polymorphs such as barite; strontium sulfate polymorphs such as celestite; or any combination thereof.

In some optional examples, the treatment fluid may comprise an additive. The additive may be used to adjust a property of the treatment fluid, for example, viscosity, density, etc. Examples of the additives include, but are not limited to, silica scale control additives, corrosion inhibitors, surfactants, gel stabilizers, anti-oxidants, polymer degradation prevention additives, relative permeability modifiers, scale inhibitors, foaming agents, defoaming agents, anti-foaming agents, emulsifying agents, de-emulsifying agents, iron control agents, proppants or other particulates, particulate diverters, salts, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, hydrate inhibitors, consolidating agents, bactericides, clay stabilizers, breakers, delayed release breakers, the like, or any combination thereof. With the benefit of this disclosure, one of ordinary skill in the art and the benefit of this disclosure will be able to formulate a treatment fluid having properties suitable for a desired application. As is standard practice in wellbore clean out operations a pre-flush or wellbore conditioning step may be necessary. Such steps include an aqueous based pre-flush fluid that displaces any wellbore and formation fluid, typically a brine; a hydrocarbon removing step or pill that consists of an organic solvent agent to remove deposits of hydrocarbon phases that can prevent the contact of the dissolving agent with the mineral scale, for instance xylene, diesel, kerosene, heavy naphthas; and a spacer fluid or suitable brine to prevent mixing of the organic solvent stage with the treatment fluid or dissolver stage. After said clean out operations, the scale may be exposed and ready for contact with the disclosed treatment fluids.

EXAMPLES

The present disclosure may be better understood by reference to the following examples, which are offered by way of illustration. The present disclosure is not limited to the examples provided herein.

Example 1

Three experimental samples were prepared having the compositions illustrated by Table 1:

TABLE 1

| | % (w/v) PMIDA | % (w/v) Triethanolamine | % (w/v) Acid | NaHCO$_3$ (s) | pH |
|---|---|---|---|---|---|
| EXP 1 | 10 | 0.01 | 0.2 Glycolic | 0 | 8.5 |
| EXP 2 | 10 | 0 | 0.2 Glycolic | 0 | 8.5 |
| EXP 3 | 20 | 0 | 5% Chloroacetic | 10 g | 9.5 |

Figure 3:
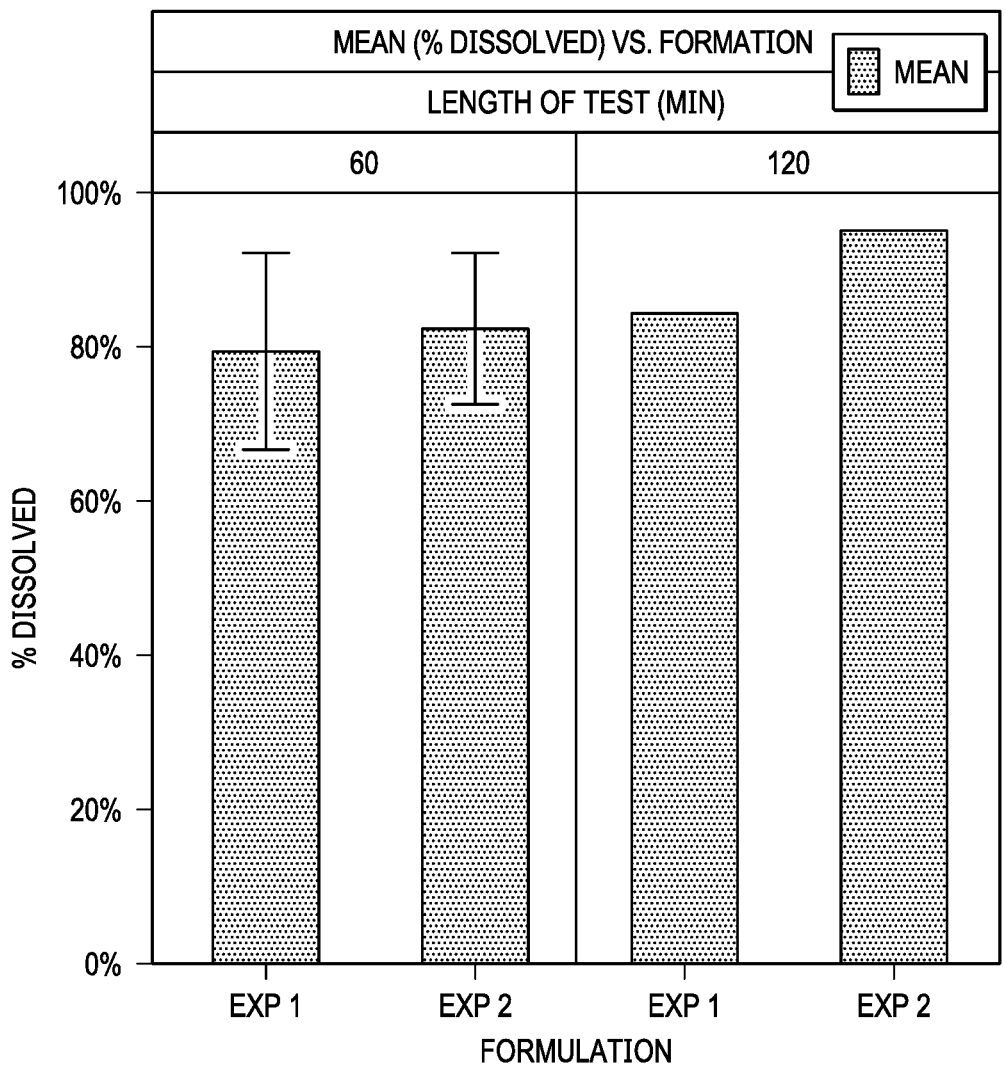
FIG. 3 is a graph illustrating a comparison of metal sulfate scale dissolution for two example formulations of a treatment fluid in accordance with one or more examples described herein.

1 g of gypsum was added to 50 mL of both EXP 1 and EXP 2. Two experiments were conducted measuring the amount of gypsum dissolved at either one hour or two hours. The reaction temperature was 200° F. FIG. 3 illustrates the results. It was observed that approximately 80% of the gypsum was dissolved by one hour for both of the experimental samples.

Example 2

Figure 4:
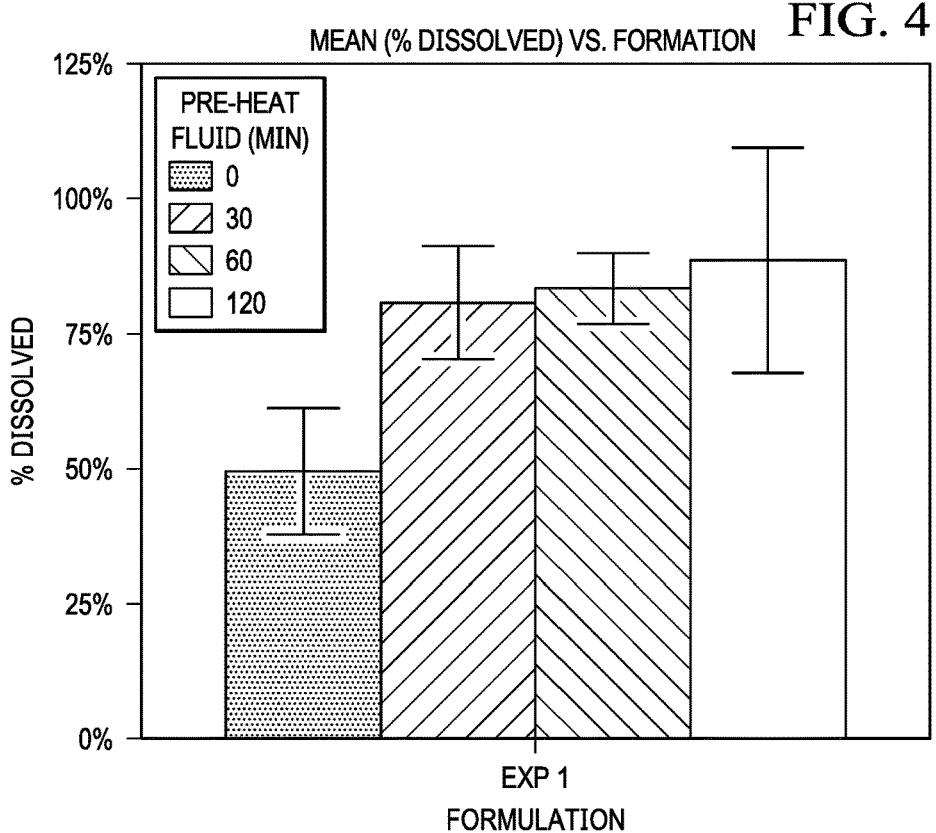
FIG. 4 is a graph illustrating metal sulfate scale dissolution for an example formulation of a treatment fluid in accordance with one or more examples described herein.

A second experiment was performed using the formulation of EXP 1. The percent dissolution of 1 g of gypsum was measured after pre-heating the EXP 1 formulation for 30 minutes, 60 minutes, or 120 minutes. The samples were pre-heated to a temperature of 200° F. The reaction temperature was 200° F. The reaction time was one hour. The results are illustrated by FIG. 4. It was observed that after 30 minutes of pre-heating, there was no significant difference in the dissolution of the gypsum.

Example 3

Figure 5:
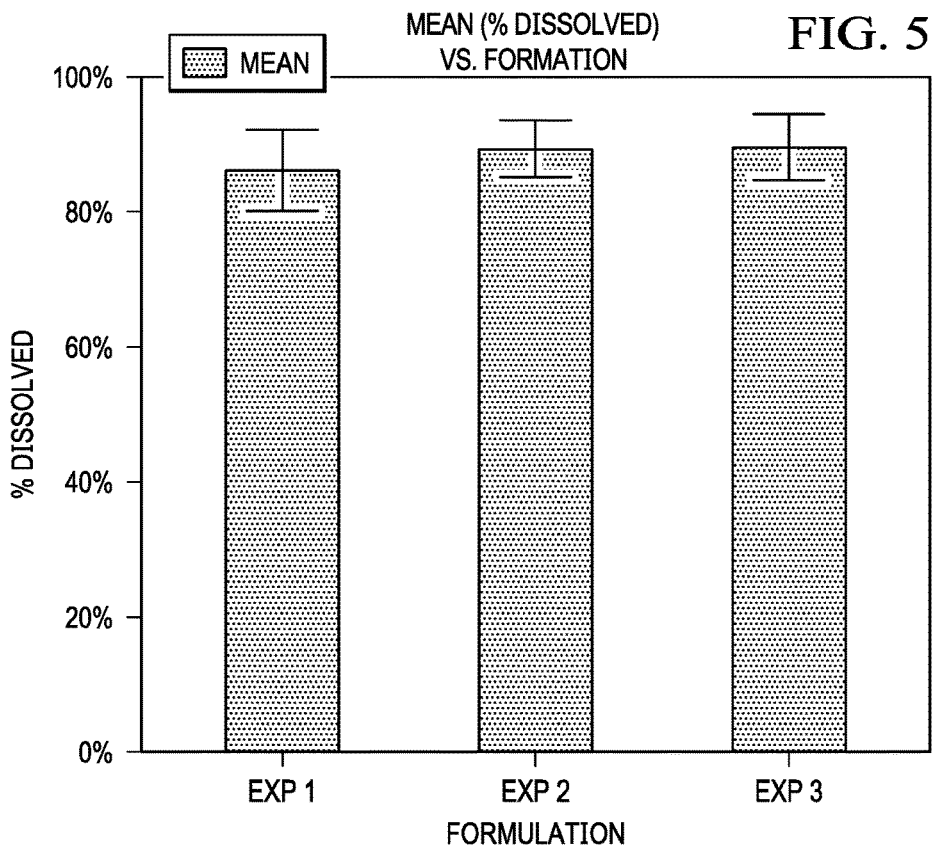
FIG. 5 is a graph illustrating metal sulfate scale dissolution for three example formulations of a treatment fluid in accordance with one or more examples described herein.

A third experiment was performed using the formulation in EXP 3. In this instance the anhydrous form of calcium sulfate was used, namely anhydrite, instead of gypsum as was used in Examples 1 and 2. The test was conducted by placing 1 g of the anhydrite in 50 mL of the EXP 3 formulation while at room temperature, and then immersing the container in a thermostated water bath for 60 min at 200° F. The container was then removed from the water bath and any residual solids were separated from the liquid fraction by filtration. The mass of the recovered solids was then measured. The results are illustrated by FIG. 5 and Table 2 below which compare the EXP 3 example 3 experiment with that of the EXP 1 and EXP 2 experiments in example 1 described above:

TABLE 2

| Test | Mass % Dissolution |
|---|---|
| EXP 1 | 89% |
| EXP 2 | 92% |
| EXP 3 | 93% |

It is also to be recognized that the disclosed treatment fluids may also directly or indirectly affect the various downhole equipment and tools that may contact the treatment fluids disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the methods and systems generally described above and depicted in FIGS. 1-5.

Provided are methods of removing metal sulfate scale in accordance with the disclosure and the illustrated FIGs. An example method comprises introducing a treatment fluid into a wellbore comprising metal sulfate scale, wherein the treatment fluid comprises: a phosphonated aminocarboxylate; a carboxylated alkanol, a carboxylated alkyl halide, and/or a multicarboxylic acid; an anion; and an aqueous base fluid; wherein the treatment fluid has a pH in a range between about 7 to about 13. The method further comprises contacting the metal sulfate scale with the treatment fluid;

wherein the treatment fluid is allowed to remain static during the contacting; and removing the treatment fluid from the wellbore.

Additionally or alternatively, the method may include one or more of the following features individually or in combination. The phosphonated aminocarboxylate may be a phosphonated aminocarboxylate selected from the group consisting of N-Phosphonomethyl iminodiacetic acid, methylenephosphonic acid, N,N-bis(phosphonomethyl)glycine; phosphonobutanetricarboxylic acid, 2-carboxy ethyl phosphonic acid, 2-hydroxyphosphonocarboxylic acid, salts thereof, hydrates thereof, acids thereof, esters thereof, derivatives thereof, and any combination thereof. The carboxylated alkanol, carboxylated alkyl halide, and/or a multicarboxylic acid may be a carboxylated alkanol, carboxylated alkyl halide, and/or a multicarboxylic acid selected from the group consisting of glycolic acid, mandelic acid, lactic acid, chloroacetic acid, dichloroacetic acid, trichloroacetic acid, bromoacetic acid, fluoroacetic acid, citric acid, tartaric acid, salts thereof, esters thereof, hydrates thereof, derivatives thereof, and any combination thereof. The anion may be an anion selected from the group consisting of a halide, an alkanol amine, a trialkylamine, a polyamine, an oxoanion, an anionic surfactant, derivatives thereof, and any combination thereof. The treatment fluid may further comprise carbonate or bicarbonate. The treatment fluid may not comprise carbonate or bicarbonate. The metal sulfate scale may be a calcium sulfate scale. The pH of the treatment fluid may be in a range between about 8.5 to about 10. The treatment fluid may be allowed to remain static during the contacting for a time period of four hours or less. The treatment fluid may be allowed to remain static during the contacting for a time period of two hours or less and wherein 80% of more of the metal sulfate scale is dissolved during the time period. The metal sulfate scale may be dissolved in the treatment fluid without conversion of the metal sulfate scale to a metal carbonate scale.

Provided are treatment fluids for removing metal sulfate scale in accordance with the disclosure and the illustrated FIGs. An example treatment fluid comprises a phosphonated aminocarboxylate; a carboxylated alkanol, carboxylated alkyl halide, and/or a multicarboxylic acid; an anion; and an aqueous base fluid; wherein the treatment fluid has a pH in a range between about 7 to about 13.

Additionally or alternatively, the treatment fluid may include one or more of the following features individually or in combination. The phosphonated aminocarboxylate may be a phosphonated aminocarboxylate selected from the group consisting of N-Phosphonomethyl iminodiacetic acid, methylenephosphonic acid, N,N-bis(phosphonomethyl)glycine; phosphonobutanetricarboxylic acid, 2-carboxy ethyl phosphonic acid, 2-hydroxyphosphonocarboxylic acid, salts thereof, hydrates thereof, acids thereof, esters thereof, derivatives thereof, and any combination thereof. The carboxylated alkanol, carboxylated alkyl halide, and/or a multicarboxylic acid may be a carboxylated alkanol, carboxylated alkyl halide, and/or a multicarboxylic acid selected from the group consisting of glycolic acid, mandelic acid, lactic acid, chloroacetic acid, dichloroacetic acid, trichloroacetic acid, bromoacetic acid, fluoroacetic acid, citric acid, tartaric acid, salts thereof, esters thereof, hydrates thereof, derivatives thereof, and any combination thereof. The anion may be an anion selected from the group consisting of a halide, an alkanol amine, a trialkylamine, a polyamine, an oxoanion, an anionic surfactant, derivatives thereof, and any combination thereof. The treatment fluid may further comprise carbonate or bicarbonate. The treatment fluid may not comprise carbonate or bicarbonate. The metal sulfate scale may be a calcium sulfate scale. The pH of the treatment fluid may be in a range between about 8.5 to about 10. The treatment fluid may be allowed to remain static during the contacting for a time period of four hours or less. The treatment fluid may be allowed to remain static during the contacting for a time period of two hours or less and wherein 80% of more of the metal sulfate scale is dissolved during the time period. The metal sulfate scale may be dissolved in the treatment fluid without conversion of the metal sulfate scale to a metal carbonate scale.

Provided are systems for removing metal sulfate scale in accordance with the disclosure and the illustrated FIGs. An example system comprises a treatment fluid comprising: a phosphonated aminocarboxylate; a carboxylated alkanol, carboxylated alkyl halide, and/or a multicarboxylic acid; an anion; and an aqueous base fluid; wherein the treatment fluid has a pH in a range between about 7 to about 13. The system further comprises mixing equipment configured to mix the phosphonated aminocarboxylate, the carboxylated alkanol, and/or the multicarboxylic acid, the anion, and the aqueous base fluid to provide the treatment fluid; and pumping equipment configured to pump the treatment fluid into the wellbore to a location comprising the metal sulfate scale.

Additionally or alternatively, the system may include one or more of the following features individually or in combination. The pumping equipment may be configured to not circulate the treatment fluid during a reaction time in which the treatment fluid is contacting the metal sulfate scale. The phosphonated aminocarboxylate may be a phosphonated aminocarboxylate selected from the group consisting of N-Phosphonomethyl iminodiacetic acid, methylenephosphonic acid, N,N-bis(phosphonomethyl)glycine; phosphonobutanetricarboxylic acid, 2-carboxyethyl phosphonic acid, 2-hydroxyphosphonocarboxylic acid, salts thereof, hydrates thereof, acids thereof, esters thereof, derivatives thereof, and any combination thereof. The carboxylated alkanol, carboxylated alkyl halide, and/or a multicarboxylic acid may be a carboxylated alkanol, carboxylated alkyl halide, and/or a multicarboxylic acid selected from the group consisting of glycolic acid, mandelic acid, lactic acid, chloroacetic acid, dichloroacetic acid, trichloroacetic acid, bromoacetic acid, fluoroacetic acid, citric acid, tartaric acid, salts thereof, esters thereof, hydrates thereof, derivatives thereof, and any combination thereof. The anion may be an anion selected from the group consisting of a halide, an alkanol amine, a trialkylamine, a polyamine, an oxoanion, an anionic surfactant, derivatives thereof, and any combination thereof. The treatment fluid may further comprise carbonate or bicarbonate. The treatment fluid may not comprise carbonate or bicarbonate. The metal sulfate scale may be a calcium sulfate scale. The pH of the treatment fluid may be in a range between about 8.5 to about 10. The treatment fluid may be allowed to remain static during the contacting for a time period of four hours or less. The treatment fluid may be allowed to remain static during the contacting for a time period of two hours or less and wherein 80% of more of the metal sulfate scale is dissolved during the time period. The metal sulfate scale may be dissolved in the treatment fluid without conversion of the metal sulfate scale to a metal carbonate scale.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method of removing metal sulfate scale, the method comprising:
    introducing a treatment fluid into a wellbore comprising metal sulfate scale, wherein the treatment fluid comprises:
        a phosphonated aminocarboxylate;
        a carboxylated alkanol, a carboxylated alkyl halide, and/or a multicarboxylic acid;
        an anion; and
        an aqueous base fluid; wherein the treatment fluid has a pH in a range between about 7 to about 13; wherein the pH is adjusted with the ammonium hydroxide;
    contacting the metal sulfate scale with the treatment fluid; wherein the treatment fluid is allowed to remain static during the contacting for a time period of four hours or less.

2. The method of claim 1, wherein the phosphonated aminocarboxylate is a phosphonated aminocarboxylate selected from the group consisting of N-Phosphonomethyl iminodiacetic acid, methylenephosphonic acid, N,N-bis (phosphonomethyl)glycine; phosphonobutanetricarboxylic acid, 2-carboxyethyl phosphonic acid, 2-hydroxyphosphonocarboxylic acid, salts thereof, hydrates thereof, acids thereof, esters thereof, derivatives thereof, and any combination thereof.

3. The method of claim 1, wherein the carboxylated alkanol, carboxylated alkyl halide, and/or a multicarboxylic acid is a carboxylated alkanol, carboxylated alkyl halide, and/or a multicarboxylic acid selected from the group consisting of glycolic acid, mandelic acid, lactic acid, chloroacetic acid, dichloroacetic acid, trichloroacetic acid, bromoacetic acid, fluoroacetic acid, citric acid, tartaric acid, salts thereof, esters thereof, hydrates thereof, derivatives thereof, and any combination thereof.

4. The method of claim 1, wherein the anion is an anion selected from the group consisting of a halide, an alkanol amine, a trialkylamine, a polyamine, an oxoanion, an anionic surfactant, derivatives thereof, and any combination thereof.

5. The method of claim 1, wherein the treatment fluid further comprises carbonate or bicarbonate.

6. The method of claim 1, wherein the treatment fluid does not comprise carbonate or bicarbonate.

7. The method of claim 1, wherein the metal sulfate scale is a calcium sulfate scale.

8. The method of claim 1, wherein the pH of the treatment fluid is in a range between about 8.5 to about 10.

9. The method of claim 1, wherein the treatment fluid is allowed to remain static during the contacting for a time period of two hours or less and wherein 80% of more of the metal sulfate scale is dissolved during the time period.

10. The method of claim 1, wherein the metal sulfate scale is dissolved in the treatment fluid without conversion of the metal sulfate scale to a metal carbonate scale.

11. The method of claim 1, wherein the concentration of the phosphonated aminocarboxylate in the treatment fluid ranges from about 1% (w/v) to about 50% (w/v).

12. The method of claim 1, wherein the total concentration of the carboxylate-containing alkanol, carboxylated alkyl halide, and the multicarboxylic acid in the treatment fluid ranges from about 0.5% (w/v) to about 30% (w/v).

13. The method of claim 1, wherein the treatment fluid comprises the carboxylated alkanol.

14. The method of claim 1, wherein the treatment fluid comprises the carboxylated alkyl halide.

15. The method of claim 1, wherein the treatment fluid comprises the multicarboxylic acid.

16. The method of claim 1, wherein the concentration of the anion in the treatment fluid ranges from about 0.05% (w/v) to about 9.5% (w/v).

17. The method of claim 1, wherein the aqueous base fluid comprises fresh water, salt water, seawater, brine, an aqueous salt solution, or a combination thereof.

18. The method of claim 1, wherein the concentration of the aqueous base fluid in the treatment fluid ranges from about 0.5% (w/v) to about 25% (w/v).

19. The method of claim 1, wherein the metal sulfate scale comprises a calcium sulfate polymorph, a barium sulfate polymorphs, a strontium sulfate polymorphs, or any combination thereof.

20. The method of claim 1, wherein the treatment fluid further comprises an additive selected from the group consisting of silica scale control additives, corrosion inhibitors, surfactants, gel stabilizers, anti-oxidants, polymer degradation prevention additives, relative permeability modifiers, scale inhibitors, foaming agents, defoaming agents, anti-foaming agents, emulsifying agents, de-emulsifying agents, iron control agents, proppants or other particulates, particulate diverters, salts, fluid loss control additives, gas, catalysts, clay control agents, dispersants, flocculants, scavengers, gelling agents, lubricants, friction reducers, bridging agents, viscosifiers, weighting agents, solubilizers, hydrate inhibitors, consolidating agents, bactericides, clay stabilizers, breakers, delayed release breakers, the like, and any combination thereof.

* * * * *